(12) United States Patent
Sakakibara et al.

(10) Patent No.: US 7,639,579 B2
(45) Date of Patent: Dec. 29, 2009

(54) WHITE DOT OUT DETECTING DEVICE

(75) Inventors: Takatomi Sakakibara, Hirakata (JP); Toshihiro Torii, Uji (JP)

(73) Assignee: Panasonic Corporation, Osaka (JP)

( * ) Notice: Subject to any disclaimer, the term of this patent is extended or adjusted under 35 U.S.C. 154(b) by 673 days.

(21) Appl. No.: 11/258,042

(22) Filed: Oct. 26, 2005

(65) Prior Publication Data

US 2006/0104179 A1      May 18, 2006

(30) Foreign Application Priority Data

Nov. 12, 2004    (JP)    ............................. 2004-329113

(51) Int. Cl.
*G11B 7/00*    (2006.01)

(52) U.S. Cl. .................................................. 369/53.15

(58) Field of Classification Search ........................ None
See application file for complete search history.

(56) References Cited

U.S. PATENT DOCUMENTS

| | | | | |
|---|---|---|---|---|
| 7,215,631 B2* | 5/2007 | Horibe et al. | ............. | 369/124.1 |
| 7,230,897 B2* | 6/2007 | Izumi | ..................... | 369/53.15 |
| 7,362,674 B2* | 4/2008 | Torii et al. | ............... | 369/53.15 |

FOREIGN PATENT DOCUMENTS

| JP | 2003-196853 | 7/2003 |
|---|---|---|
| WO | WO 2004061845 A1 * | 7/2004 |

* cited by examiner

*Primary Examiner*—Joseph H Feild
*Assistant Examiner*—Joseph Haley
(74) *Attorney, Agent, or Firm*—McDermott Will & Emery LLP

(57) ABSTRACT

A white dot out detecting device according to the present invention comprises a recording/reproduction control signal generator for generating a recording/reproduction control signal showing a recording state or a reproducing state of an optical disk, a variable gain amplifier for amplifying and outputting an information signal read from the optical disk and adjusting a gain in the amplification based on the recording/reproduction control signal, an envelope detector for detecting an output envelope of the variable gain amplifier, an integrator for integrating an output of the envelope detector, a slice level setting unit for setting a slice level as a reference for detecting a white dot out based on an output of the integrator, a comparator for detecting the white dot out based on comparison of the output of the envelope detector and the slice level to each other, and a level shifter for temporarily shifting the slice level to a high-level side when a change of the recording/reproduction control signal is detected.

7 Claims, 12 Drawing Sheets

WHITE DOT OUT DETECTING DEVICE

BACKGROUND OF THE INVENTION

1. Field of the Invention

The present invention relates to a white dot out detecting device incorporated into an optical disk apparatus or the like and serving to detect a white dot out (or white drop out). The white dot out is a phenomenon in which a volume of reflected light is amplified and a potential on a bright side thereby temporarily soars due to a defect on the optical disk (a part on the optical disk where write and read operations cannot be normally executed).

2. Description of the Related Art

In recent years, an information volume handled in a computer system has been significantly increasing, in response to which an optical disk apparatus capable of executing a high-rate operation and random accesses and having a large capacity is widely used as an information data recording/reproducing apparatus. In the optical disk apparatus, optical disks such as generally-called CD-R, CD-RW, DVD-R/RW, DVD-RAM and BLU-RAY are used as a recording medium.

Some optical disk apparatuses are provided with a white dot out detecting device. In the white dot out detecting device, in general, an optical beam is convergently irradiated on the optical disk and an envelope variation of an information signal in accordance with an intensity of a reflected light from the optical disk is detected so that the white dot out on the optical disk is detected and a white dot out detection signal showing the presence/absence of the white dot out is outputted. The white out dot detection signal is utilized by a servo circuit for controlling a tracking servo and a focus servo with respect to the optical disk as a signal for holding a previous value. The white dot out detection signal is also utilized for obtaining an extracted signal for judging a non-recordable region on the optical disk by means of a CPU incorporated into the optical disk apparatus in order to execute various controls.

FIG. 11 is a block diagram illustrating a constitution of a conventional white dot out detecting device, an example of which is recited in No. 2003-196853 of the Publication of the Unexamined Japanese Patent Applications. In FIG. 11, a reference symbol WG denotes a recording/reproduction control signal showing that the optical disk is currently subjected to a recording process or a reproducing process. A reference numeral 11 denotes a variable gain amplifier for amplifying an information signal AS in accordance with the intensity of the reflected light from the optical disk by means of a gain in accordance with the recording/reproduction control signal WG into a predetermined amplitude. A reference numeral 12 denotes a high-rate envelope detecting circuit for detecting an envelope of an amplitude output signal AP from the variable gain amplifier 11. A reference numeral 13 denotes a first limit circuit for controlling a voltage of an envelope signal EM from the high-rate envelope detecting circuit 12 to stay within a predetermined limit voltage. A reference numeral 14 denotes an integrating circuit comprising a resistance R1 and a capacitance C1, wherein the envelope signal EM outputted from the high-rate envelope detecting circuit 12 is integrated. A reference numeral 15 denotes a slice level setting circuit for generating a slice level SD based on an integration signal IS from the integrating circuit 14. A reference numeral 16 denotes a second limit circuit for controlling a voltage of the slice level SD from the slice level setting circuit 15 to stay within a predetermined limit voltage. A reference numeral 17 denotes a comparator for comparing a first limit output signal LM1 from the first limit circuit 13 and a second limit output signal LM2 from the second limit circuit 16 to each other and activating and outputting a white dot out detection signal DD when the first is larger than the latter.

Next, an operation of the conventional white dot out detecting device is described referring to a waveform chart of FIG. 12. The optical beam is convergently irradiated on the optical disk and the information signal AS in accordance with the intensity of the reflected light from the optical disk is inputted to the variable gain amplifier 11. The variable gain amplifier 11 amplifies the information signal AS into the predetermined amplitude by means of the gain in accordance with the recording/reproduction control signal WG. The variable gain amplifier 11 outputs the amplified information signal AS to the high-rate envelope detecting circuit 12 as the amplitude output signal AP.

A level of the reflected light from the optical disk differs in the recording and reproducing operations. The variable gain amplifier 11 diminishes the difference in the levels so that it is not detected as an envelope variation. The variable gain amplifier 11 uses a level of the volume of the reflected light on a bright side as the limit voltage.

The high-rate envelope detecting circuit 12 detects the envelope of the inputted amplitude output signal AP and outputs the envelope signal EM thereby obtained to the first limit circuit 13 and the integrating circuit 14. When the white dot out is generated, the envelope signal EM includes a white dot out (WDO) component.

The first limit circuit 13 controls the limit voltage when the white dot out component included in the envelope signal EM reaches a level way beyond the bright-side level. Thereby, the white dot out component is controlled so as to stay within an input dynamic range of the comparator 17.

The integrating circuit 14 integrates the envelope signal EM from the high-rate envelope detecting circuit 12 and outputs the integration signal IS to the slice level setting circuit 15. The slice level setting circuit 15 level-converts the integration signal IS to thereby generate the slice level SD.

The second limit circuit 16 controls the limit voltage when the slice level SD reaches a level far beyond the bright-side level. Thereby, the white dot out component is controlled so as to stay within the input dynamic range of the comparator 17.

The comparator 17 binarizes the first limit output signal IM1 from the first limit circuit 13 based on the second limit output signal LM2 from the second limit circuit 16 as a reference to thereby generate and output the white dot out detection signal DD.

It is assumed here that an envelope of the information signal AS is undergoing a drastic change due to the presence of the white dot out (WDO) on the optical disk. Such a state is, for example, shown in a period T2 in FIG. 12. Because a time constant of the high-rate envelope detecting circuit 12 in the foregoing state is small, the first limit output signal LM1 resulting from the envelope signal EM inputted to the first limit circuit 13 consequently shows a waveform in response to the drastic change of the envelope. The integration signal IS resulting from the envelope signal EM inputted to the integration circuit 14 does not follow the drastic change of the information signal AS and shows a waveform subjected to a slow change (see P1). Therefore, the second limit output signal LM2 from the second limit circuit 16 shows the slowly-changing waveform in the same manner. As a result, the effective white dot out detection signal DD, such as TS1, is outputted from the comparator 17 (see P 2-3).

However, it was not possible to completely eliminate the difference in the levels of the reflected light in the recording and reproducing operations in the conventional white dot out detecting device due to such a reason that the gain setting in the variable gain amplifier 11 includes some variability. Because of the inadequacy, the level difference is generated in the amplitude output signal AP of the variable gain amplifier 11 when the operation with respect to the optical disk shifts from the recording to the reproduction or from the reproduction to the recording.

In particular, when the operation with respect to the optical disk shifts from the reproduction to the recording, the envelope signal EM promptly follows the change of the information signal AS, while the integration signal IS requires sometime to follow the change (see P31). Therefore, the second limit output signal LM2 is lower than the first limit output signal LM1 for a lengthened period of time, and a false white dot out detection signal DD, such as FS1, is outputted for a long period of time (see P32→33). Therefore, the reproduction cannot be carried out in a stable manner. Further, when the operation with respect to the optical disk is shifted from the recording to the reproduction, though the false white dot out detection signal DD is not outputted, the detection of the white dot out cannot be soon restarted immediately after the shift of the recording/reproduction. As a result, the stability in the detection of the white dot out is deteriorated (see P34 and a TF3 period).

SUMMARY OF THE INVENTION

Therefore, a main object of the present invention is to be able to accurately detect a whit dot out on an optical disk in order to ensure a high stability in recording and reproducing operations.

In order to achieve the foregoing object, a white dot out detecting device according to the present invention comprises a recording/reproduction control signal generator for generating a recording/reproduction control signal showing a recording state or a reproducing state of an optical disk, a variable gain amplifier for amplifying and outputting an information signal read from the optical disk and adjusting a gain in the amplification based on the recording/reproduction control signal, an envelope detector for detecting an output envelope of the variable gain amplifier, an integrator for integrating an output of the envelope detector, a slice level setting unit for setting a slice level as a reference for detecting a white dot out based on an output of the integrator, a comparator for detecting the white dot out based on comparison of the output of the envelope detector and the slice level to each other, and a level shifter for temporarily shifting the slice level to a high-level side when a change of the recording/reproduction control signal is detected.

According to the foregoing constitution, the level shifter detects that the operation respect to the optical disk is shifted from the recording to the reproduction or from the reproduction to the recording through the change of the recording/reproduction control signal and temporarily shifts the slice level to the high-level side based on a result of the detection (through a direct operation or indirect operation) so that an amount by which the slice level falls below an envelope signal can be reduced. Then, the generation of a false detection signal of the white dot out can be controlled. As a result, the white dot out can be more accurately detected. Referring to the amount reduction mentioned above, the amount by which the slice level falls below the envelope signal may be reduced (including zero) or the slice level may exceed the envelope signal as a possible case. The control of the false detection signal may denote that a time width of the false detection signal is reduced or that the false detection signal is not at all generated.

As a preferable mode of the foregoing constitution, a limiter for limiting the output of the envelope detector to stay within an input-side dynamic range of the comparator and a limiter for limiting the output of the slice level setting unit to stay within the input-side dynamic range of the comparator may be provided.

According to the foregoing constitution, the white dot out can be detected with a high accuracy though a large change is generated in the level of the information signal.

As a preferable mode of the foregoing constitution, a slice level shifter for shifting the slice level to even a higher-level side in synchronization with the level shifter at the time of detecting the change of the recording/reproduction control signal may be provided.

According to the foregoing constitution, the slice level shifter shifts the slice level to the even higher-level side in synchronization with the level shifter so that the white dot out can be more accurately detected.

According to the foregoing constitution, the integrator and the level shifter include preferable modes mentioned below. In a first preferable mode, the integrator comprises a first resistance serially connected to the output of the envelope detector, a capacitance disposed between an output of the first resistance and a ground, a second resistance connected in parallel to the first resistance, and a short-circuit switch for controlling a state where the second resistance is connected to the first resistance, wherein the level shifter temporarily turns on the short-circuit switch to thereby reduce a time constant of the integrator when the change of the recording/reproduction control signal is detected so that the slice level inputted to the comparator is shifted to the high-level side.

According to the foregoing constitution, when the level shifter detects the change of the recording/reproduction control signal and turns on the short-circuit switch to thereby short-circuit the second resistance, the first and second resistances are connected in parallel resulting in the reduction of a resistance value on the whole, and the time constant of the integrator is thereby temporarily reduced. Then, the integration signal becomes more rapidly responsive to the envelope signal, as a result of which the slice level temporarily shifts to the high level. Thereby, the generation of the false detection signal of the white dot out can be controlled, and the detection of the white dot out can be sooner restarted immediately after the shift of the recording/reproducing operations.

In a second preferable mode, the integrator comprises a resistance serially connected to the output of the envelope detector, a capacitance disposed between an output of the resistance and the ground, and a short-circuit switch connected in parallel to the resistance, wherein the level shifter temporarily turns on the short-circuit switch to thereby reduce the time constant of the integrator when the change of the recording/reproduction control signal is detected so that the slide level inputted to the comparator is shifted to the high-level side.

According to the foregoing constitution, the level shifter detects the change of the recording/reproduction control signal and turns on the short-circuit switch connected in parallel to the resistance of the integrator to thereby short-circuit the resistance so that the time constant of the integrator can be temporarily reduced and the integration signal becomes more rapidly responsive to the envelope signal. As a result, the slice level is temporarily shifted to the high level. Thereby, the generation of the false detection signal of the whit dot out can be further controlled, and the detection of the white dot out can be even sooner restarted immediately after the shift of the recording/reproducing operations.

In a third preferable mode, the integrator comprises a resistance serially connected to the output of the envelope detector, a capacitance disposed between the resistance and the ground, and an initialization switch for connecting the capacitance to a limit voltage, wherein the level shifter temporarily turns on the initialization switch to thereby initialize a potential of the capacitance to the limit voltage when the change of the recording/reproduction control signal is detected so that the slice level inputted to the comparator is shifted to the high-level side.

According to the foregoing constitution, the level shifter detects the change of the recording/reproduction control signal and turns on the initialization switch to thereby initialize the capacitance to the limit voltage so that the capacitance is up. As a result, the slice level is temporarily shifted to the high level. Thereby, the detection of the false detection signal of the white dot out can be surely prevented.

As a more preferable mode, the integrator comprises a resistance serially connected to the output of the envelope detector, a capacitance disposed between an output of the resistance and the ground, a short-circuit switch connected in parallel to the resistance, and an initialization switch for connecting the capacitance to the limit voltage, wherein the level shifter turns on the initialization switch to thereby initialize the potential of the capacitance of the integrator to the limit voltage and thereafter turns on the short-circuit switch to thereby reduce the time constant of the integrator when the change of the detection of the recording/reproduction control signal is detected so as to shift the slice level inputted to the comparator to the high-level side.

According to the foregoing constitution, the level shifter detects the change of the recording/reproduction control signal and turns on the initialization switch to thereby initialize the capacitance to the limit voltage so that the capacitance is up. As a result, the generation of the false detection signal of the white dot out can be reliably prevented, and further, the level shifter subsequently turns on the short-circuit switch to thereby short-circuit the resistance so that the integration time constant can be reduced and the integration signal become more rapidly responsive to the envelope signal. As a result, the slice level is temporarily shifted to the high level. Thereby, the detection of the white dot out can be sooner restarted immediately after the shift of the recording/reproducing operations.

As a possible constitution, the recording/reproduction control signal generator may be omitted, and a signal equal to the recording/reproduction control signal and externally supplied may be used in place of the recording/reproduction control signal.

As described so far, according to the present invention, the shift of the operation with respect to the optical disk from the recording to the reproduction or from the reproduction to the recording can be detected through the change of the recording/reproduction controls signal, and the slice level is directly or indirectly temporarily shifted to the high-level side. Thereby, the generation of the false detection signal of the white dot out can be controlled, and the white dot out can be more accurately detected. As a result, the recording and reproducing operations can be carried out in an optical disk apparatus with an increased stability.

The white dot out detecting device according to the present invention is capable of accurately detecting the white dot out on the optical disk and is effectively adopted as a white dot out detecting device and the like used in the optical disk apparatus and the like.

BRIEF DESCRIPTION OF THE DRAWINGS

These and other objects as well as advantages of the invention will become clear from the following description of preferred embodiments of the invention and appended claims. A number of benefits not recited in this specification will come to the attention of the skilled in the art upon the implementation of the present invention.

DETAILED DESCRIPTION OF PREFERRED EMBODIMENTS

Figure 1:
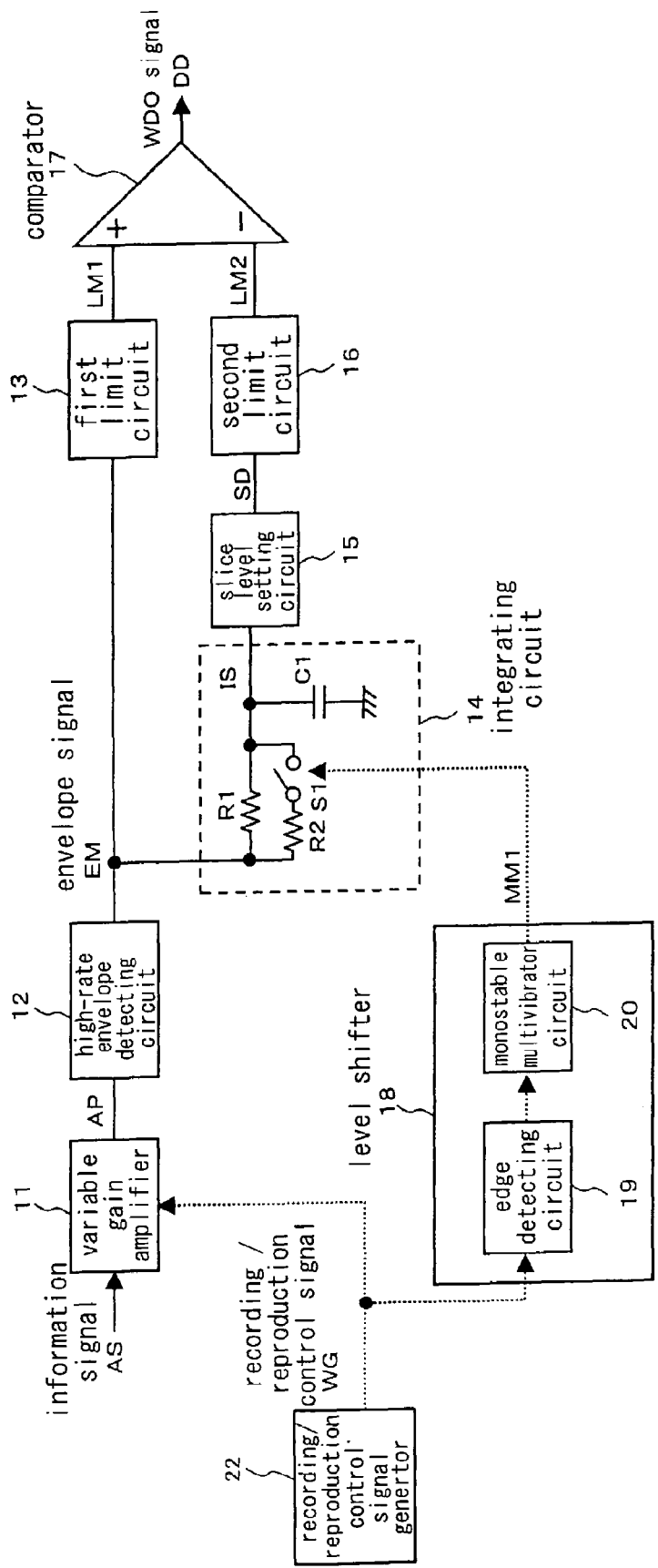
FIG. 1 is a block diagram illustrating a constitution of a white dot out detecting device according to an embodiment 1 of the present invention.

Hereinafter, preferred embodiments of a white dot out detecting device according to the present invention are described in detail referring to the drawings.

Embodiment 1

FIG. 1 is a block diagram illustrating a constitution of a white dot out detecting device according to an embodiment 1 of the present invention. In FIG. 1, a reference symbol WG denotes a recording/reproduction control signal showing that a recording operation or a reproducing operation is executed with respect to an optical disk. A reference numeral 22 denotes a recording/reproduction control signal generator for detecting an operation-state of an optical disk recording/reproduction apparatus (not shown) and generating the recording/reproduction control signal WG. A reference numeral 11 denotes a variable gain amplifier as a variable gain amplifier. A reference numeral 12 denotes a high-rate envelope detecting circuit serving as an envelope detector. A reference numeral 13 denotes a first limit circuit for controlling a voltage of an envelope signal EM from the high-rate envelope detecting circuit 12 to stay within a predetermined limit voltage. A reference numeral 14 denotes an integrating circuit serving as an integrator, the integrating circuit 14 integrating the envelope signal EM outputted from the high-rate envelope detecting circuit 12. A reference numeral 15 denotes a slice level setting circuit for setting a slice level to a high-level side relative to an output of the integrating circuit 14 (integration signal IS) used as a reference. A reference numeral 16 denotes a second limit circuit for controlling a slice level SD from the slice level setting circuit 15 to stay within a predetermined limit voltage. A reference numeral 17 denotes a comparator for comparing a first limit output signal LM1 of the first limit circuit 13 and a second limit output signal LM2 of the second limit circuit 16 to each other and activating and outputting a white dot out detection signal DD when the first is larger than the latter. In the case where the optical disk recording/reproduction apparatus has a function of outputting a signal equal to the recording/reproduction control signal WG in the constitution according to the present embodiment, the recording/reproduction control signal WG may be directly supplied from the recording/reproduction apparatus. In that case, the recording/reproduction control signal generator 22 is not provided.

Figure 9:
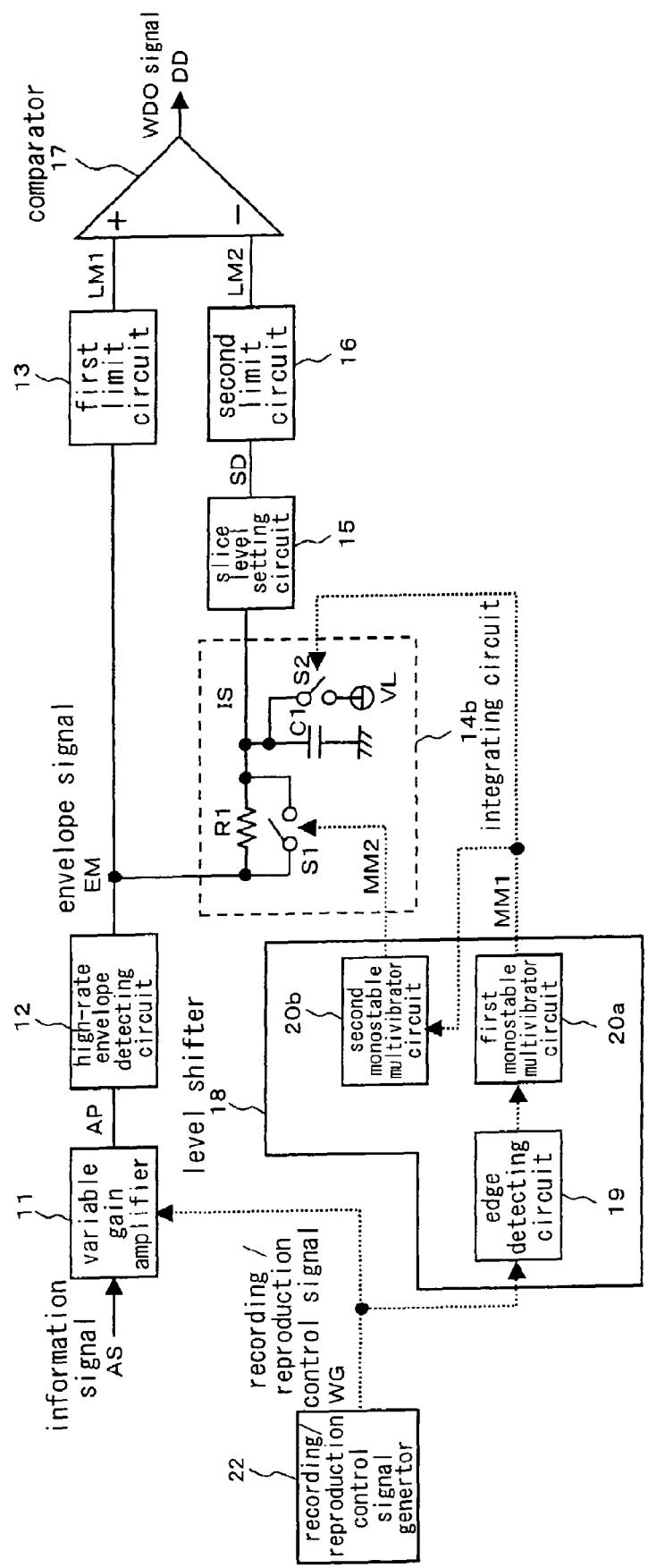
FIG. 9 is a block diagram illustrating a constitution of a white dot out detecting device according to an embodiment 5 of the present invention.

The foregoing constitution is basically the same as in the conventional technology shown in FIG. 9. The embodiment 1 of the present invention is characterized in comprising a level shifter 18 for reducing a time constant of the integrating circuit 14 during a predetermined period t1 when the recording/reproduction control signal WG is changed and shifting the slice level SD on the reference side inputted to the comparator 17 to the high-level side during the predetermined period t1.

The level shifter 18 comprises an edge detecting circuit 19 for detecting a signal-level variation of the recording/reproduction control signal WG and outputting a pulse and a monostable multivibrator circuit 20 for generating and outputting a one-shot signal MM1 of a pulse shape at an "H" level for the predetermined period t1 in response to the reception of the pulse from the edge detecting circuit 19.

The integrating circuit 14 that outputs the integration signal IS obtained by integrating the envelope signal EM to the slice level setting circuit 15 comprises a first resistance R1 serially connected to an output of the high-rate envelope detecting circuit 12, a capacitance C1 disposed between an output of the first resistance R1 and a ground, a second resistance R2 connected in parallel to the first resistance R1, and a short-circuit switch S1 for controlling a state where the second resistance R2 is connected to the first resistance R1.

One end of the capacitance C1 is grounded, and a connecting point of the first resistance R1 and the capacitance C1 is connected to an input terminal of the slice level setting circuit 15. The short-circuit switch S1 is turned off when the one-shot signal MM1 of the monostable multivibrator circuit 20 is at an "L" level and turned on when the one-shot signal MM1 is at the "H" level. In the integrating circuit 14, the integration time constant is set to a small value because the first resistance R1 and the second resistance R2 are connected in parallel to the short-circuit switch S1.

Figure 2:
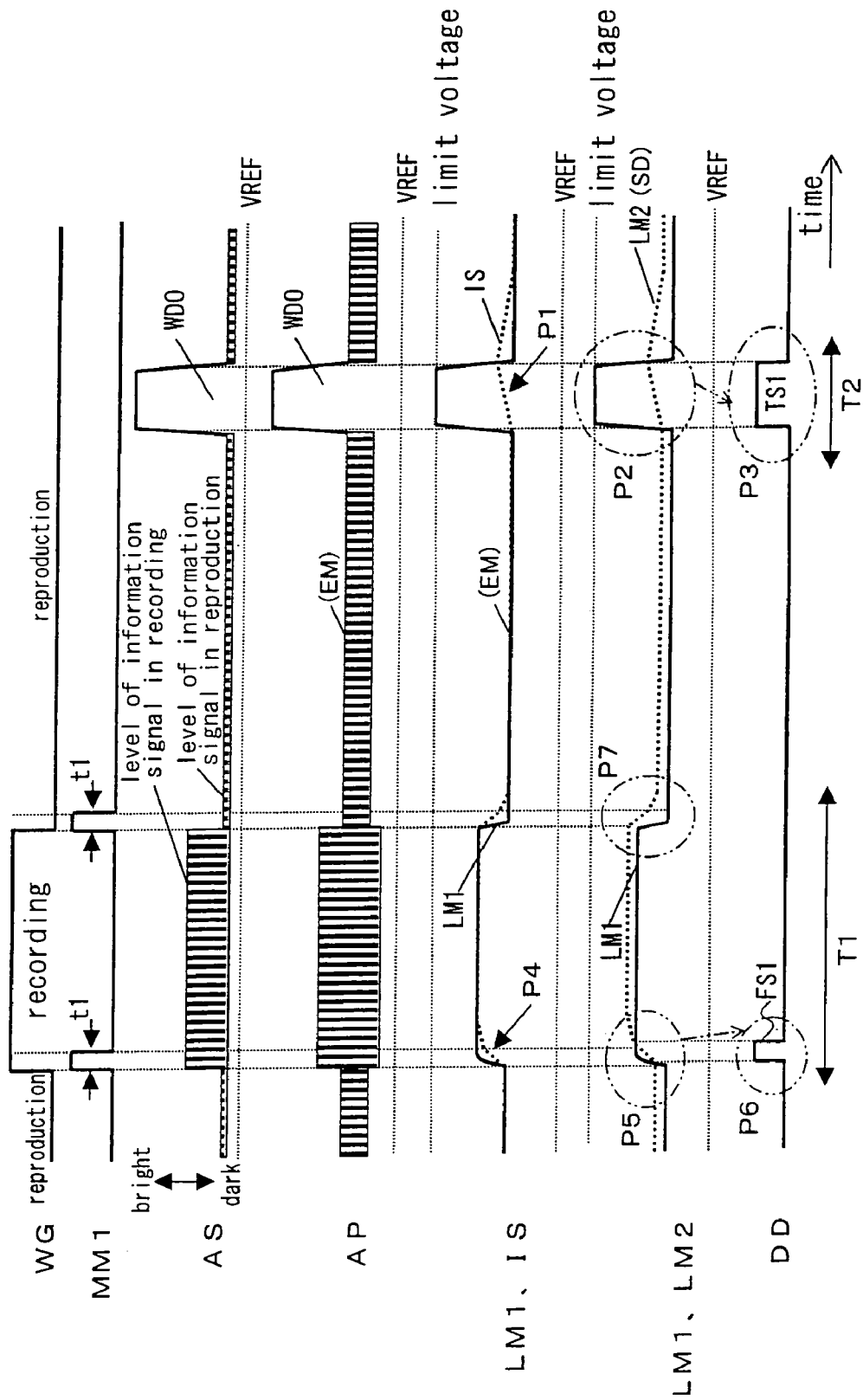
FIG. 2 is a waveform chart illustrating an operation of the white dot out detecting device according the embodiment 1.

Next, an operation of the white dot out detecting device according to the present embodiment constituted as above is described referring to a waveform chart shown in FIG. 2.

Description of General Operation

An optical beam is convergently irradiated on the optical disk and reflected from the optical disk. The reflected light is received by a plurality of light-receiving elements (not shown). These light-receiving elements convert the received light into an electrical signal corresponding to an intensity of the light and outputs the electrical signal. The outputs of the plurality of light-receiving elements are summed, and a signal obtained by the summation is inputted to the variable gain amplifier 11 as an information signal AS. The variable gain amplifier 11 is supplied with the recording/reproduction control signal WG showing that the operation with respect to the optical disk is the recording or the reproduction from the recording/reproduction control signal generator 22. The recording/reproduction control signal WG is at the "H" level in the case of the recording operation with respect to the optical disk, while being at the "L" level in the case of the reproducing operation with respect to the optical disk ("H" and "L" respectively denote a high logic state and a low logic state).

The optical beam irradiated on the optical disk is modulated in such manner that a power thereof is changed, for example, from 15 mW at maximum to 0.5 mW at minimum in the recording operation. In the reproducing operation, the optical beam is irradiated with a power that is constant and relatively small in comparison to the recording operation.

The larger and brighter the power of the optical beam is, the larger a level of the information signal AS is. As a result, a large difference is generated between the level of the information signal AS in the reproducing operation and an average level of the information signal AS in the recording operation. The variable gain amplifier 11 changes a gain in accordance with the recording/reproduction control signal WG so that the difference is reduced. To be specific, the variable gain amplifier 11 reduces the gain in the recording operation, while increasing the gain in the reproducing operation so that the information signal AS is amplified, and outputs an amplitude output signal AP thereby obtained to the high-rate envelope detecting circuit 12.

The high-rate envelope detecting circuit 12 is a generally-used detecting circuit, wherein an envelope on an upper side (bright side) of the amplitude output signal AP is detected and outputted. The detected envelope signal EM is outputted to the first limit circuit 13 and the integrating circuit 14. In the first limit circuit 13, an upper-limit value corresponding to an input dynamic range of the comparator 17 is set. The first limit circuit 13 controls the received envelope signal EM to stay within the input dynamic range of the comparator 17 based on the comparison of the envelope signal EM to the upper-limit value and outputs the controlled envelope signal EM to a non inversion input terminal (+) of the comparator 17. The integrating circuit 14 generates the integration signal obtained by integrating the envelope signal EM and outputs the generated integration signal IS to the slice level setting circuit 15.

The recording/reproduction control signal WG is also supplied to the edge detecting circuit 19. The edge detecting circuit 19 outputs the pulse to the monostable multivibrator circuit 20 when the signal level of the received recording/reproduction control signal is changed. The monostable multivibrator circuit 20 receives the pulse from the edge detecting circuit 19 and correspondingly generates and outputs the one-shot signal MM1 at the "H" level during the predetermined period t1 starting at a time point of the reception. The predetermined period t1 is set to a period as short as possible in comparison to a reproducing period and a recording period. Thereby, the monostable multivibrator circuit 20 temporarily outputs the one-shot signal MM1 in synchronization with the reception of the pulse from the edge detecting circuit 19.

When the one-shot signal MM1 is at the "L" level, the short-circuit switch S1 is turned off, and only the first resistance R1 is thereby connected. As a result, the integration time constant of the integrating circuit 14 is increased.

When the one-shot signal MM1 is at the "H" level, the short-circuit switch S1 is turned on, and the first resistance R1 and the second resistance R2 are thereby in the parallelly-connected state. As a result, the integration time constant is reduced, and the integration signal IS becomes more rapidly responsive to the envelope signal EM at that time (during the period when the one-shot signal MM1 is at the "L" level).

The slice level setting circuit 15 is supplied with the integration signal IS from the integrating circuit 14. The slice level setting circuit 15 sets the slice level SD to the higher-level side relative to the supplied integration signal IS used as the reference. The slice level setting circuit 15 outputs the set slice level SD to the second limit circuit 16. In the second limit circuit 16, an upper-limit value corresponding to the input dynamic range of the comparator 17 is set. The second limit circuit 16 controls the received slice level SD to stay within the input dynamic range of the comparator 17 based on the comparison of the slice level SD received from the integrating circuit 14 to the upper-limit value and outputs the controlled slice level SD to an inversion input terminal (−) of the comparator 17.

When the White Dot Out is Detected

Next, an operation when the white dot out is detected is described (see period T2 shown in FIG. 2).

The description below refers to the reproduction as an example, however, the operation in the recording operation is executed in the same manner. When a certain period of time passes after the reproduction started, the one-shot signal MM1 of the monostable mulvibrator circuit 20 is at the "L" level, and the short-circuit switch S1 of the integrating circuit 14 is turned off.

When the white dot out is present on the optical disk and the reflected light is intensified, the levels of the information signal AS and the amplitude output signal AP are increased. The high-rate envelope detecting circuit 12 outputs the envelope signal EM whose level is substantially equal to that of the amplitude output signal AP in compliance with the amplitude output signal AP whose level is increased by the white dot out. The integrating circuit 14 does not follow the increase of the level of the envelope signal EM due to the white dot out because the time constant thereof is larger than that of the high-rate envelope detecting circuit 12 (see P1). To be specific, the levels of the integration signal IS outputted from the integrating circuit 14 and the slice level SD outputted from the slice level setting circuit 15 hardly change during the period when the level of the envelope signal EM is increased due to the white dot out.

Therefore, when the envelope signal EM increases to exceed the slice level SD due to the white dot out, the comparator 17 outputs a pulse TS1 showing the detection of the white dot out as the white dot out detection signal DD (see P3) provided that the first limit output signal LM1 exceeds the second limit output signal LM2 in response to the increase of the slice level SD (see P2).

The first limit output signal LM1 and the second limit output signal LM2 are respectively supplied to the comparator 17 in the state where they stay within the input dynamic range of the comparator 17 (level range) based on the actions of the first limit circuit 13 and the second limit circuit 16. Therefore, the voltages of the first limit output signal LM1 and the second limit output signal LM2 are controlled so that they do not reach and exceed the limit voltage (input dynamic range of the comparator 17).

When the Recording/Reproduction are Switched

Next, an operation of the white dot out detecting device when the recording shifts to the reproduction or vice versa is described (see period T1 shown in FIG. 2).

In the case where the gain is inappropriate because there is a variability in the gain setting in the variable gain amplifier 11, as shown in FIG. 2, a difference may be generated in the levels of the envelope (upper-side envelope) of the amplitude output signal AP in the recording and reproducing operations.

Figure 12:
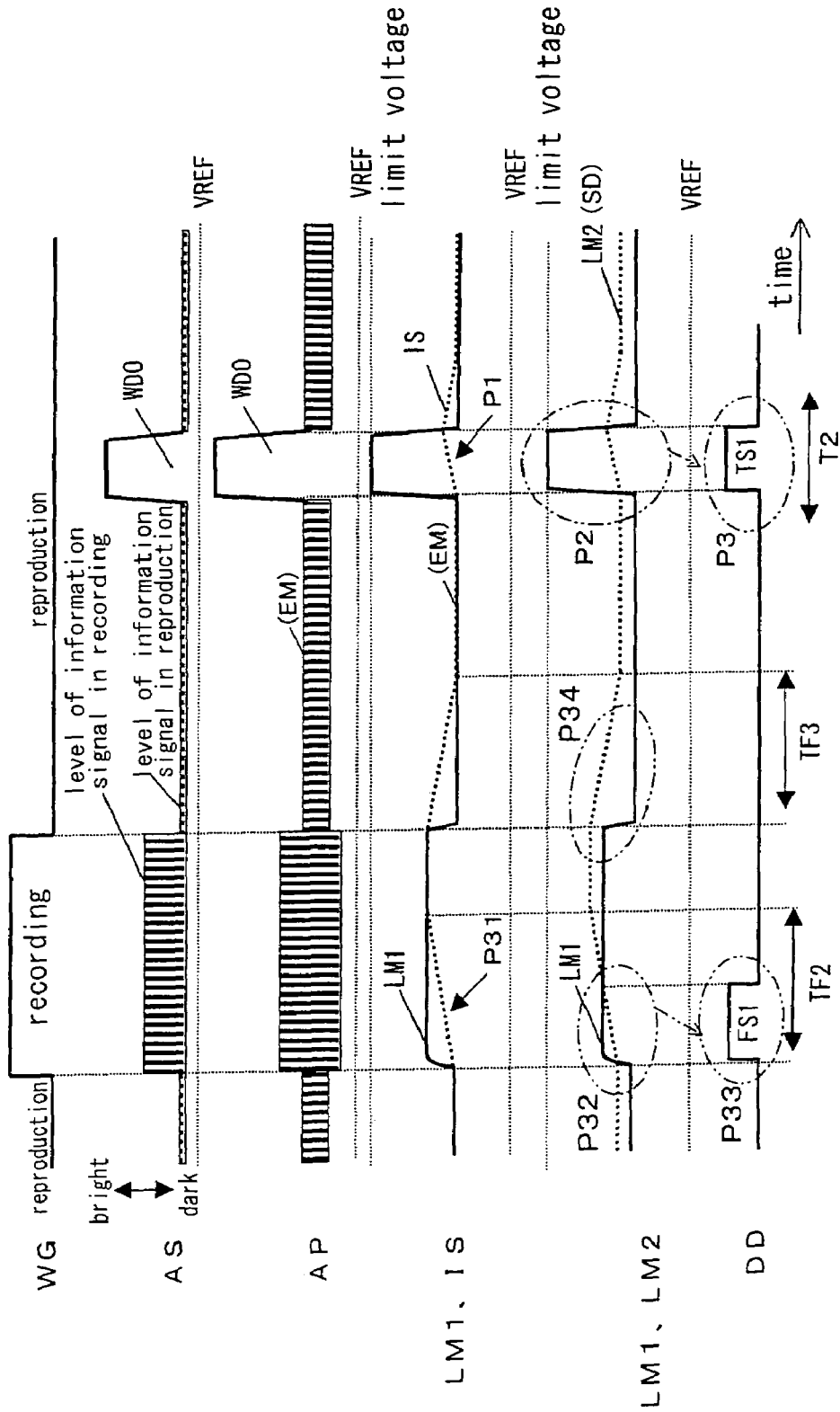
FIG. 12 is a waveform chart illustrating an operation of the white dot out detecting device according to the conventional technology.

Below is referred to such a case that the level of the upper-side envelope of the amplitude output signal AP is increased when the operation with respect to the optical disk is shifted from the recording to the reproduction or from the reproduction to the recording. According to the constitution of the conventional technology, the comparator 17 outputs a false detection signal FS1 of a pulse having a large time width as the white dot out detection signal DD because the foregoing case corresponds to the state generated when the white dot out is detected (see P33 of FIG. 12).

In contrast to the conventional technology, according to the present embodiment, the edge detecting circuit 19 monitors the variation of the signal level of the recording/reproduction control signal WG and generates the pulse in response to the detection that the signal level is subjected to a change equal to or more than a certain level. The monostable multivibrator circuit 20 receives the pulse from the edge detecting circuit 19 and changes the level of the one-shot signal MM1 to be at the "H" level during the predetermined period t1. Then, in the integrating circuit 14 supplied with the one-shot signal MM1 from the monostable multivibrator circuit 20, the short-circuit switch S1 is turned on, and the first resistance R1 and the second resistance R2 are thereby in the parallelly-connected state. Therefore, the time constant of the integrating circuit 14 is reduced, and the responsiveness is thereby accelerated. As a result, the slice level is temporarily shifted to the high level, and the integration signal IS from the integrating circuit 14 promptly follows the envelope signal EM (see P4).

The slice level setting circuit 15 generates the slice level SD based on the integration signal IS supplied from the integrating circuit 14 and supplies the generated slice level SD to the second limit circuit 16. The second limit circuit 16 controls the slice level SD received from the integrating circuit 14 to stay within the input dynamic range of the comparator 17 and outputs the controlled slice level SD to the inversion input terminal (−) of the comparator 17 as the second limit output signal LM2. The first limit circuit 13 controls the voltage of the envelope signal EM to stay within the predetermined limit voltage and outputs the voltage-controlled envelope signal EM to the non inversion input terminal (+) of the comparator 17 as the fist limit output signal LM1.

The comparator 17 compares the firs limit output signal LM1 to the second limit output signal LM2 used as the reference. Thereby, the false detection signal FS1 is outputted in a shorter period of time (see. P5→P6).

As described, according to the white dot out detecting device of the present embodiment, the integration time constant is reduced based on the one-shot signal generated when it is detected that the operation with respect to the optical disk is shifted from the recording to the reproduction or from the reproduction to the recording. Then, the slice level is temporarily shifted to the high level. Thereby, the responsiveness in the period t1 is improved, and the slice level is correspondingly increased. As a result, the period when the false detection signal FS1 is generated is shortened, and the detection of the white dot out can be sooner restarted immediately after the recording/reproduction are switched (see P7).

Embodiment 2

Figure 3:
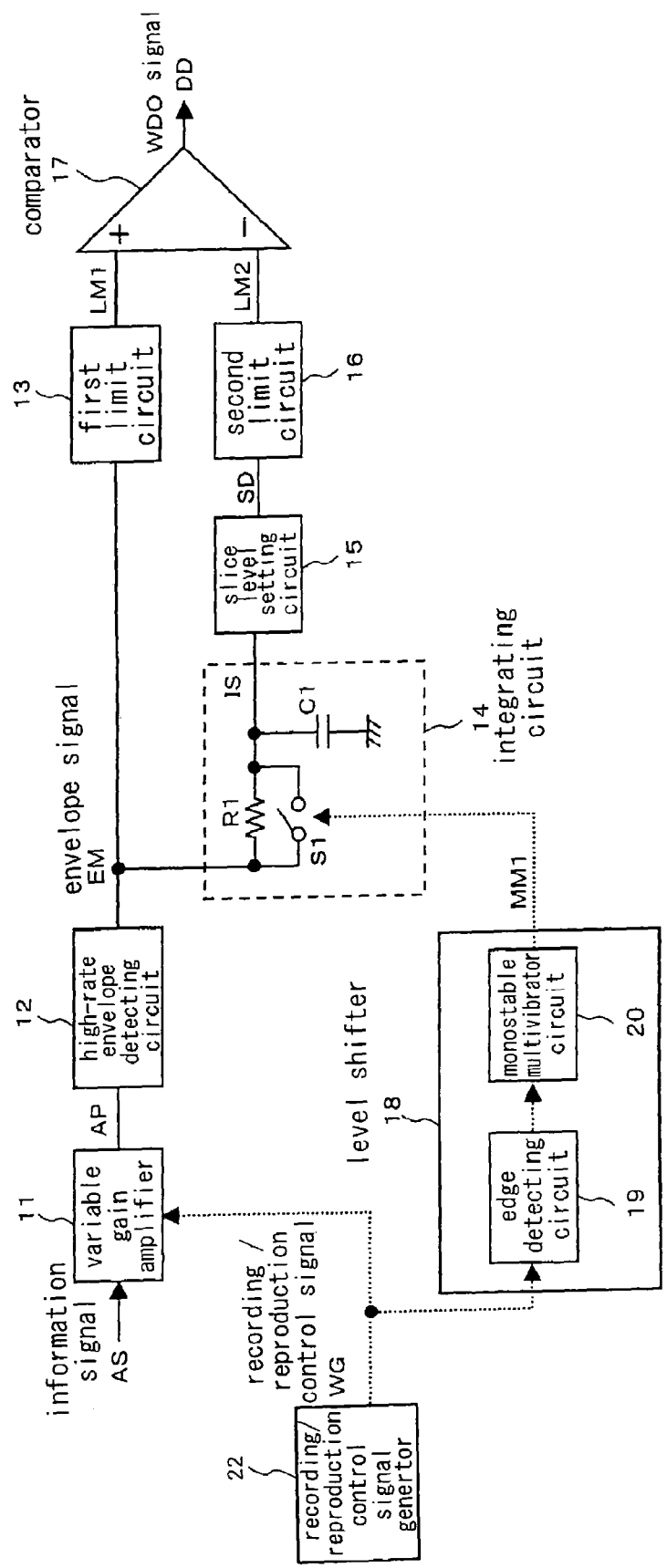
FIG. 3 is a block diagram illustrating a constitution of a white dot out detecting device according to an embodiment 2 of the present invention.

FIG. 3 is a block diagram illustrating a constitution of a white dot out detecting device according to an embodiment 2 of the present invention. In the white dot out detecting device according to the present embodiment, the second resistance R2 of the integrating circuit 14 is omitted in the constitution shown in FIG. 1. According to the present embodiment, the integrating circuit 14 in charge of the output to the slice level setting circuit 15 comprises the first resistance R1 (hereinafter, simply referred to as resistance), capacitance C1, and short-circuit switch S1 connected in parallel to the resistance R1. One end of the capacitance C1 is grounded, and the connecting point of the first resistance R1 and the capacitance C1 is connected the input terminal of the slice level setting circuit 15. The short-circuit switch S1 controls the integration time constant based on the edge detection of the recording/reproduction control signal WG. Because the rest of the constitution is not any different to the constitution described in the embodiment 1, the like components are simply provided with the same reference symbols and not described here again.

Figure 4:
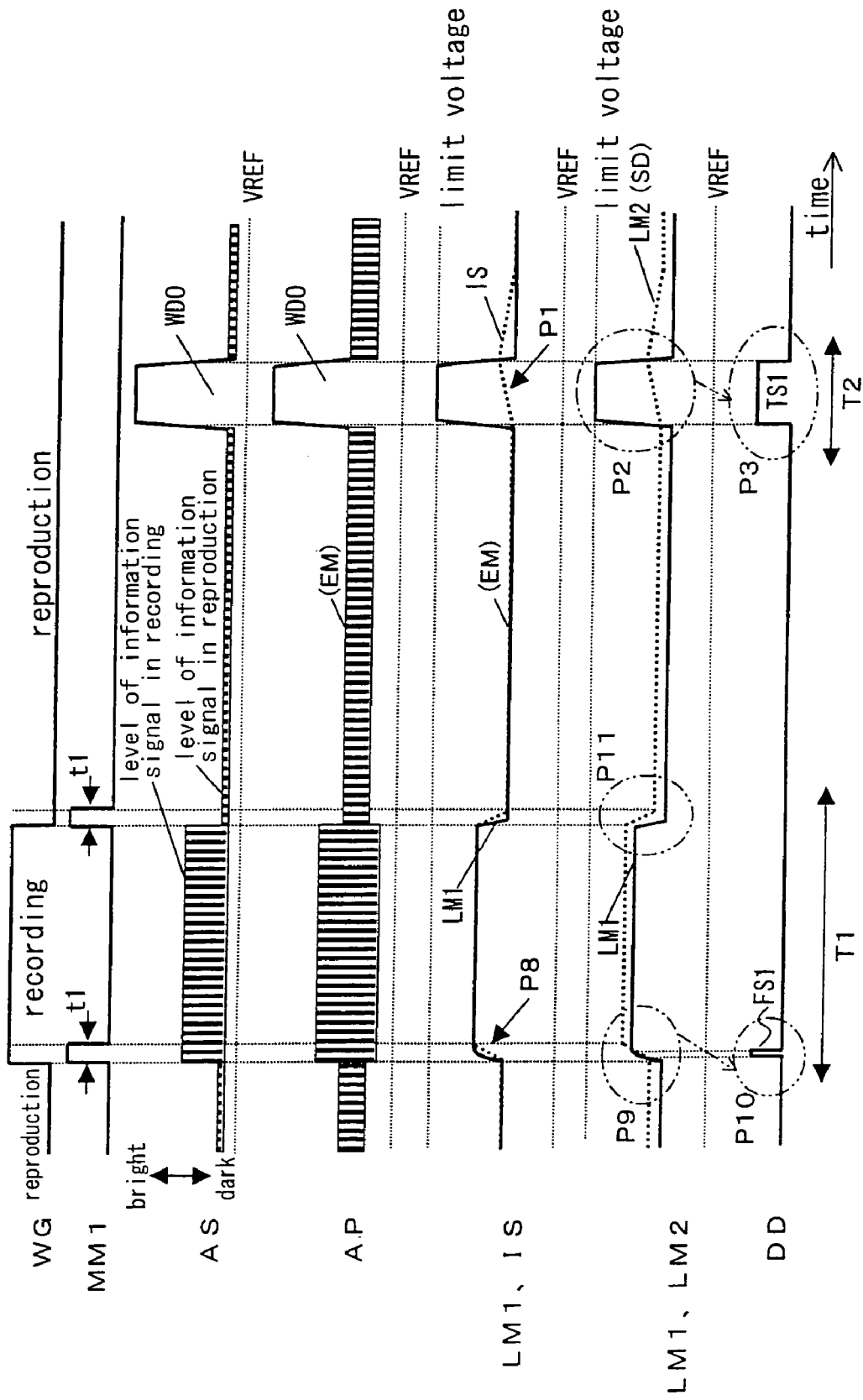
FIG. 4 is a waveform chart illustrating an operation of the white dot out detecting device according the embodiment 2.

Next, an operation of the white dot out detecting device according to the present embodiment constituted as above is described referring to a waveform chart shown in FIG. 4.

When the White Dot Out is Detected

In the period T2, the one-shot signal MM1 of the monostable multivibrator circuit 20 is at the "L" level, and the short-circuit switch S1 is turned off. Then, the slice level setting circuit 15 generates and outputs the slice level SD of an ordinary level. Therefore, the operation in the period T2 is the same as described in the embodiment 1.

When the Recording/Reproduction are Switched

When the operation with respect to the optical disk is shifted from the recording to the reproduction or from the reproduction to the recording, the edge detecting circuit 19 outputs the pulse to the monostable multivibrator circuit 20 in response to the change of the signal level of the recording/reproduction control signal WG. The monostable multivibrator circuit 20 receives the pulse from the edge detecting circuit 19 and correspondingly generates and outputs the one-shot signal MM1 at the "H" level in the period t1 and at the "L" level in any other period.

When the one-shot signal MM1 is at the "L" level, the shot-circuit switch S1 is turned off and the time constant of the integrating circuit 14 is large. On the contrary, when the one-shot signal MM1 is at the "H" level, the short-circuit switch S1 is turned on and the resistance R1 is short-circuited. As a result, the integration time constant is reduced and the slice level is temporarily shifted to the high level. Thereby, the responsiveness of the integration signal IS relative to the envelope signal EM is accelerated. As a result, the integration signal IS from the integrating circuit 14 promptly follows the envelope signal EM (see P8).

The slice level setting circuit 15 generates the slice level SD based on the integration signal IS and supplies the generated slice level SD to the second limit circuit 16. The second limit circuit 16 controls the slice level SD received from the integrating circuit 14 to stay within the input dynamic range of the comparator 17 and outputs the controlled slice level SD to the inversion input terminal (−) of the comparator 17 as the second limit output signal LM2. The first limit circuit 13 controls the voltage of the envelope signal EM to stay within the predetermined limit voltage and outputs the voltage-controlled envelope signal EM to the non inversion input terminal (+) of the comparator 17 as the first limit output signal IM1.

The comparator 17 compares the first limit output signal LM1 to the second limit output signal LM2 used as the reference. Thereby, the period when the false detection signal FS1 is outputted is shortened (see P9→P10).

Thus, according to the white dot out detecting device of the present embodiment, the integration time constant is reduced based on the one-shot signal generated when it is detected that the operation with respect to the optical disk is shifted from the recording to the reproduction or from the reproduction to the recording. Then, the slice level is temporarily shifted to the high level. Thereby, the responsiveness in the period t1 is improved, and the slice level is correspondingly increased. As a result, the period when the false detection signal FS1 is generated is shortened, and the detection of the white dot out can be sooner restarted immediately after the recording/reproduction are switched (see P11).

Embodiment 3

Figure 5:
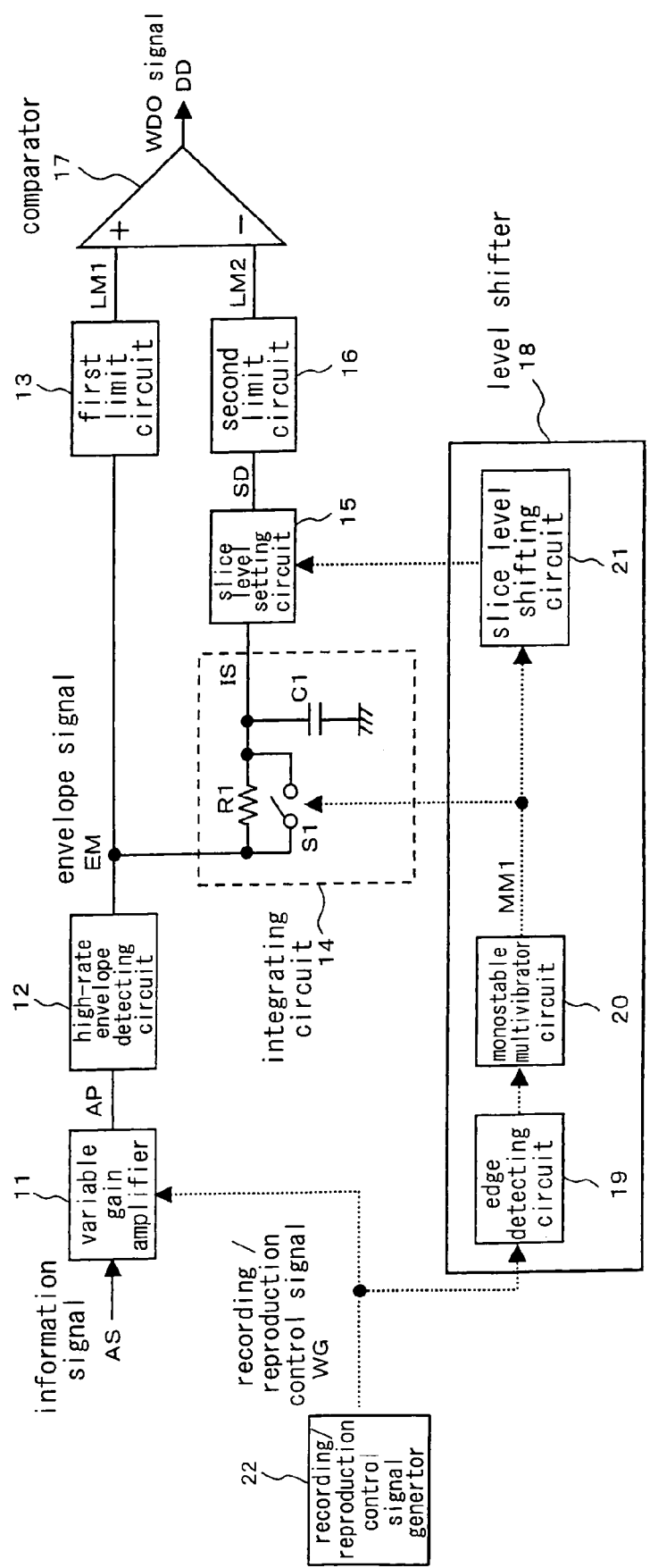
FIG. 5 is a block diagram illustrating a constitution of a white dot out detecting device according to an embodiment 3 of the present invention.

FIG. 5 is a block diagram illustrating a constitution of a white dot out detecting device according to an embodiment 3 of the present invention. In the white dot out detecting device according to the present embodiment, a slice level shifting 21 as a slice level shifter is additionally provided in the level shifter 18 in the constitution shown in FIG. 3. Thereby, the integration time constant and the slice level are simultaneously controlled through the edge detection of the recording/reproduction control signal WG in the white dot out detecting device according to the present embodiment.

The one-shot signal MM1 is supplied from the monostable multivibrator circuit 20 to the slice level shifting device 21. The slice level shifting circuit 21 controls the slice level SD of the slice level setting circuit 15 to stay at the ordinary level when the one-shot signal MM1 is at the "L" level, while controlling the slice level SD of the slice level setting circuit 15 to shift to the limit-voltage side from the ordinary level when the one-shot setting signal MM1 is at the "H" level. Because the rest of the constitution is not any different to the constitution described in the embodiment 2, the like components are simply provided with the same reference symbols and not described here again.

Figure 6:
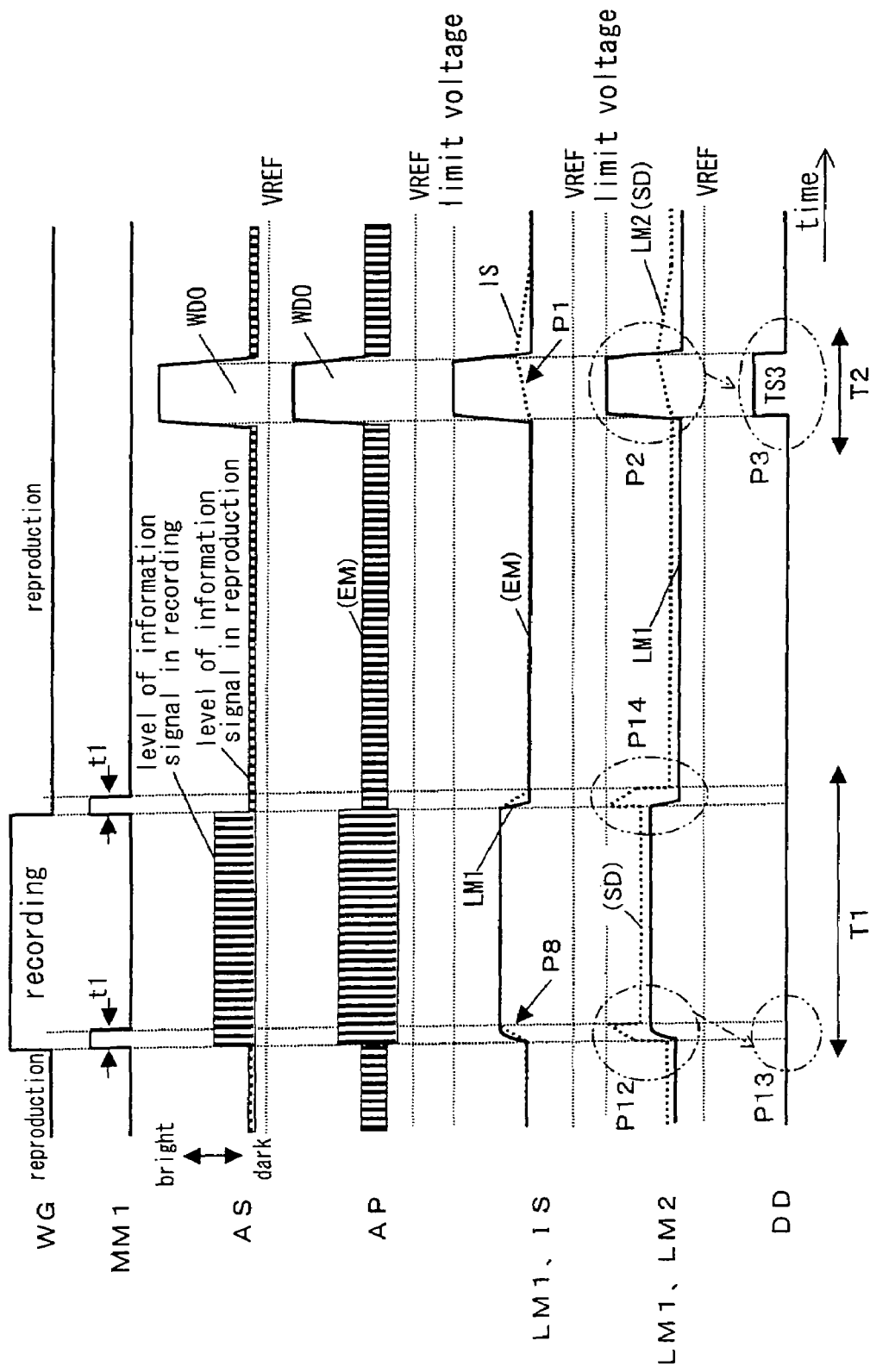
FIG. 6 is a waveform chart illustrating an operation of the white dot out detecting device according the embodiment 3.

Next, an operation of the white dot out detecting device according to the present embodiment constituted as above is described referring to a waveform chart shown in FIG. 6.

When the White Dot Out is Detected

In the period T2, the one-shot signal MM1 of the monostable multivibrator circuit 20 is at the "L" level, and the short-circuit switch S1 is turned off. Therefore, the slice level setting circuit 15 outputs the slice level SD of the ordinary level. As a result, the operation in the period T2 is the same as described in the embodiment 1.

When the Recording/Reproduction are Switched

When the operation with respect to the optical disk is shifted from the recording to the reproduction or from the reproduction to the recording, the edge detecting circuit 19 detects the change of the signal level of the recording/reproduction control signal WG, and the monostable multivibrator circuit 20 changes the level of the one-shot signal MM1 to be "H". Then, the short-circuit switch S1 of the integrating circuit 14 is turned on, the time constant thereof is reduced, and the accelerated responsiveness is obtained (see P8). Further, the slice level shifting circuit 21 controls the slice level setting circuit 15 to thereby set the slice level thereof to be higher than the ordinary level (see P12). As a result, the responsiveness in the period t1 is accelerated, which increases the slice level. Further, the slice level shifting circuit 21 controls the slice level setting circuit 15 so that the slice level SD is led further to the limit-voltage side. The generation of the false detection signal is thereby prevented (see P12→P13).

Thus, according to the white dot out detecting device of the present embodiment, the integration time constant is reduced based on the one-shot signal generated when it is detected that the operation with respect to the optical disk is shifted from the recording to the reproduction or from the reproduction to the recording. Then, the slice level is temporarily shifted to the high level. Thereby, the responsiveness in the period t1 is improved, and the slice level is correspondingly increased. Further, the processing for increasing the slice level to exceed the ordinary level is additionally executed.

As a result, according to the present embodiment, the generation of the false detection signal is prevented, the detection of the white dot out can be sooner restarted immediately after the recording/reproduction are switched (see P12 and P14), and the stability in detecting the white dot out is increased.

Embodiment 4

Figure 7:
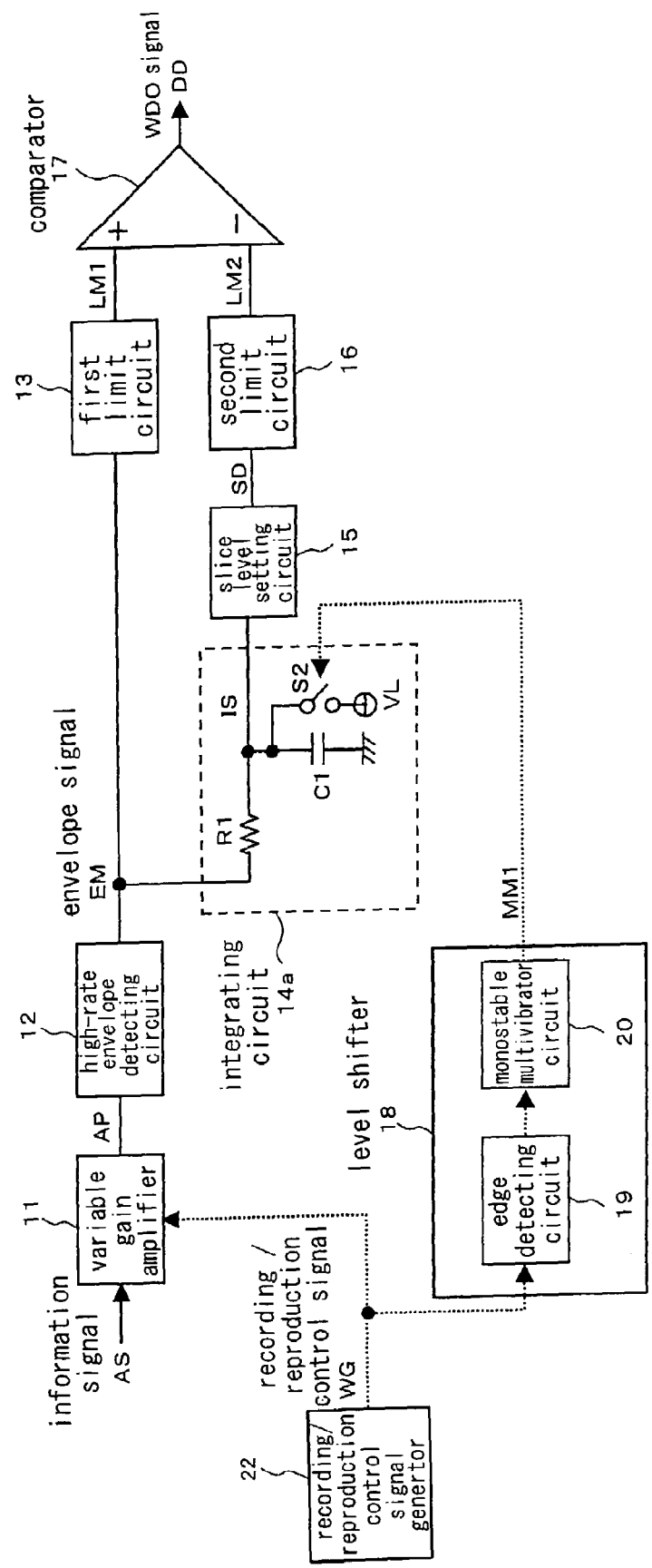
FIG. 7 is a block diagram illustrating a constitution of a white dot out detecting device according to an embodiment 4 of the present invention.

FIG. 7 is a block diagram illustrating a constitution of a white dot out detecting device according to an embodiment 4 of the present invention. In the white dot out detecting device according to the present embodiment, an integrating circuit 14a is provided in place of the integrating circuit 14 in the constitution shown in FIG. 1. The integrating circuit 14a comprises the first resistance (hereinafter, simply referred to as resistance) R1, capacitance C1 and an initialization switch S2. The connecting point of the resistance R1 and the capacitance C1 is connected to a limit voltage VL via the initialization switch S2. The initialization switch S2 is turned on and the capacitance C1 is short-circuited by the limit voltage VL when the one-shot signal MM1 of the monostable multivibrator circuit 20 is at the "H" level. When the one-shot signal MM1 is at the "L" level, the initialization switch S2 is turned off, and the short-circuit operation of the capacitance C1 is not carried out. Because the rest of the constitution is not any different to the constitution described in the embodiment 1, the like components are simply provided with the same reference symbols and not described here again.

Figure 8:
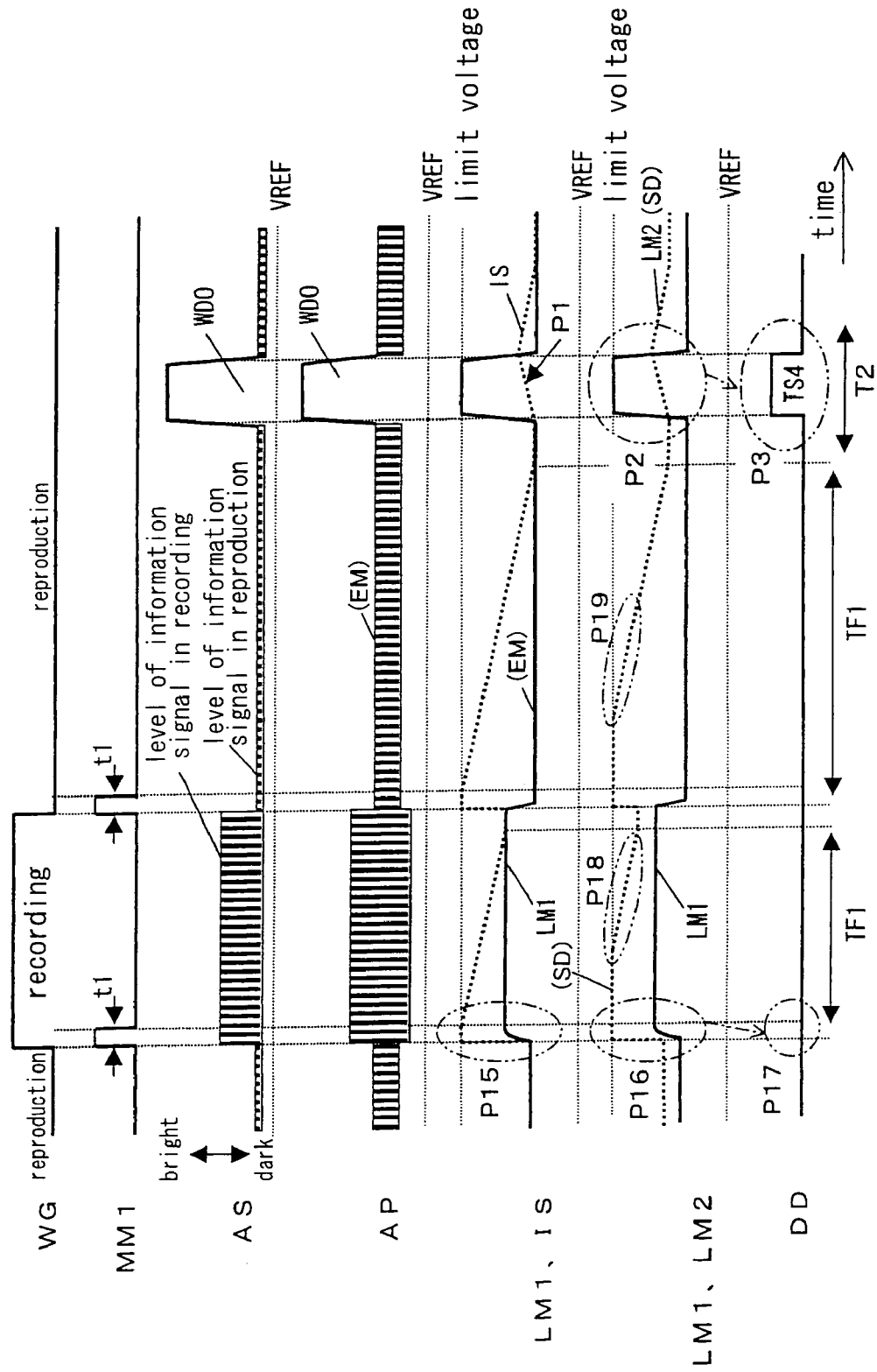
FIG. 8 is a waveform chart illustrating an operation of the white dot out detecting device according the embodiment 4.

Next, an operation of the white dot out detecting device according to the present embodiment constituted as above is described referring to a waveform chart shown in FIG. 8.

When the White Dot Out is Detected

In the period T2, the one-shot signal MM1 of the monostable multivibrator circuit 20 is at the "L" level, and the initialization switch S2 is turned off. Therefore, the operation is the same as described in the embodiment 1.

When the Recording/Reproduction are Switched

When the operation with respect to the optical disk is shifted from the recording to the reproduction or from the reproduction to the recording, the edge detecting circuit 19 detects the change of the signal level of the recording/reproduction control signal WG, and the monostable multivibrator circuit 20 changes the level of the one-shot signal MM1 to be "H". Then, the initialization switch S2 of the integrating circuit 14a is turned on, and the voltage of the capacitance C1 is initialized to the limit voltage VL. As a result, the integration signal IS of the integrating circuit 14a is fixed to the limit voltage VL during the period t1 (see P15).

Thus, according to the white dot out detecting device of the present embodiment, the integration signal IS is initialized to the limit voltage VL based on the one-shot signal generated when it is detected that the operation with respect to the optical disk is shifted from the recording to the reproduction or from the reproduction to the recording so that the slice level is shifted to the high-level side and the generation of the false detection signal is prevented (see P16→P17). As a result, the white dot out can be detected without generating any false detection.

Embodiment 5

In the embodiment 4, the startup of the integration signal IS is slow in the period TF1 (see P18 and 19), which leaves such an unsolved problem that the whit dot out cannot be detected with a high accuracy. An embodiment 5 of the present invention deals with the foregoing problem.

FIG. 9 is a block diagram illustrating a constitution of a white dot out detecting device according to the embodiment 5. In the white dot out detecting device according to the present embodiment, a second monostable multivibrator circuit 20b is provided in addition to a first monostable multivibrator circuit 20a (corresponding to the monosatable multivibrator circuit 20), and an integrating circuit 14b is provided in place of the integrating circuit 14 in the constitution shown in FIG. 1.

The first monostable multivibrator circuit 20a outputs a one-shot signal MM1 thereof to the second monostable multivibrator circuit 20b and the initialization switch S2 of the integrating circuit 14b. The second monostable multivibrator circuit 20b outputs a one-shot signal MM2 thereof to the shoft-circuit switch S1 of the integrating circuit 14b. The second monostable multivibrator circuit 20b generates and outputs the one-shot signal MM2 at the "H" level in a predetermined period t2 when a level of the one-shot signal MM1 changes from "H" to "L". The period t2 of the predetermined length is set to a period as short as possible in comparison the reproducing period and the recording period in the same manner as the period t1.

The integrating circuit 14b comprises the first resistance (hereinafter, simply referred to as resistance) R1, capacitance C1, short-circuit switch S1 and initialization switch S2. The resistance R1 is serially connected to the output of the high-rate envelope detecting circuit 12. The capacitance C1 is disposed between the output of the resistance R1 and the ground. The short-circuit switch S1 is connected in parallel to the resistance R1. The initialization switch S2 connects the capacitance C1 to the limit voltage.

The connecting point of the resistance R1 and the capacitance C1 is connected to the limit voltage VL via the initialization switch S2. Because the rest of the constitution is not any different to the constitution described in the embodiment 1, the like components are simply provided with the same reference symbols and not described here again.

Figure 10:
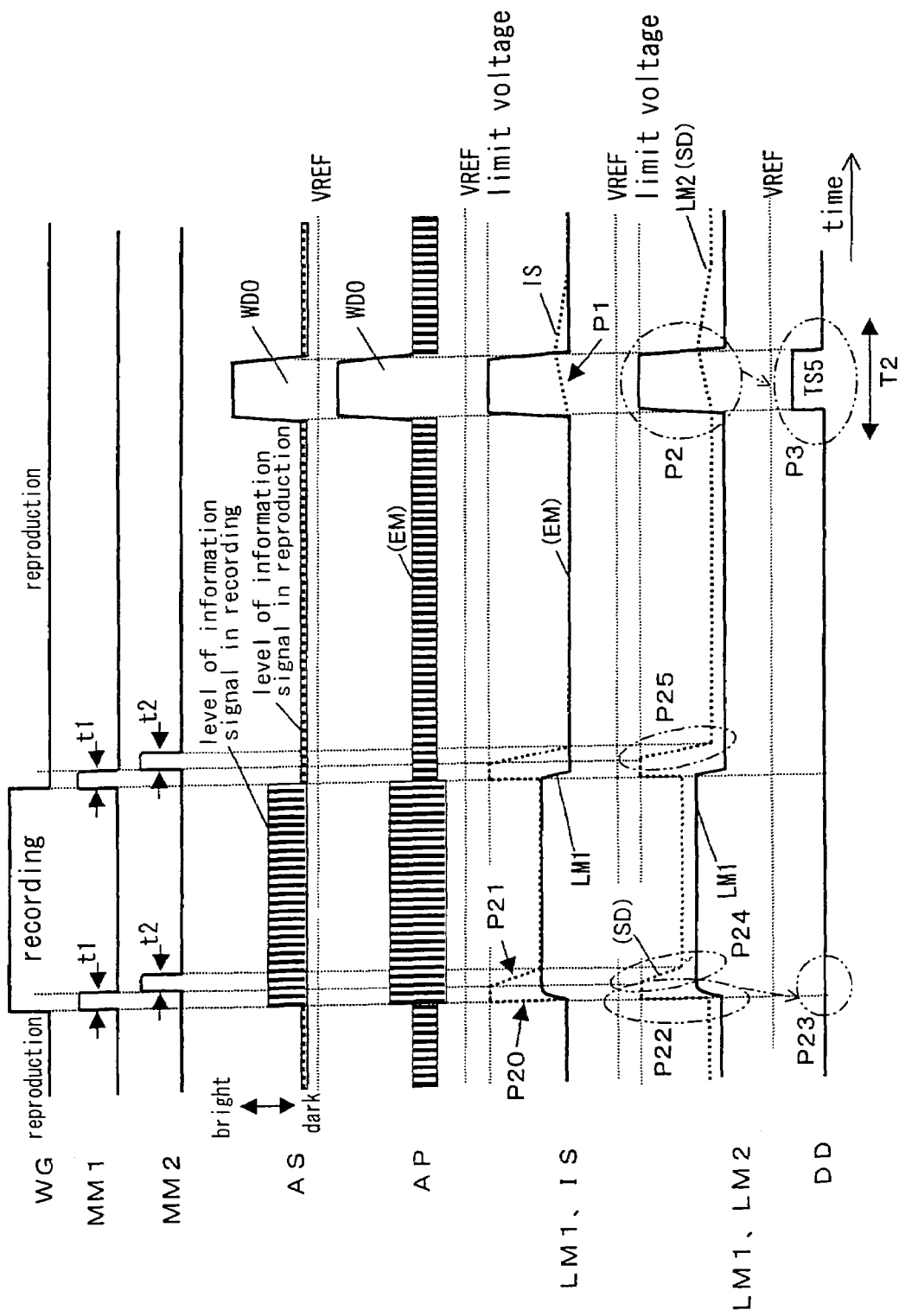
FIG. 10 is a waveform chart illustrating an operation of the white dot out detecting device according the embodiment 5.
Figure 11:
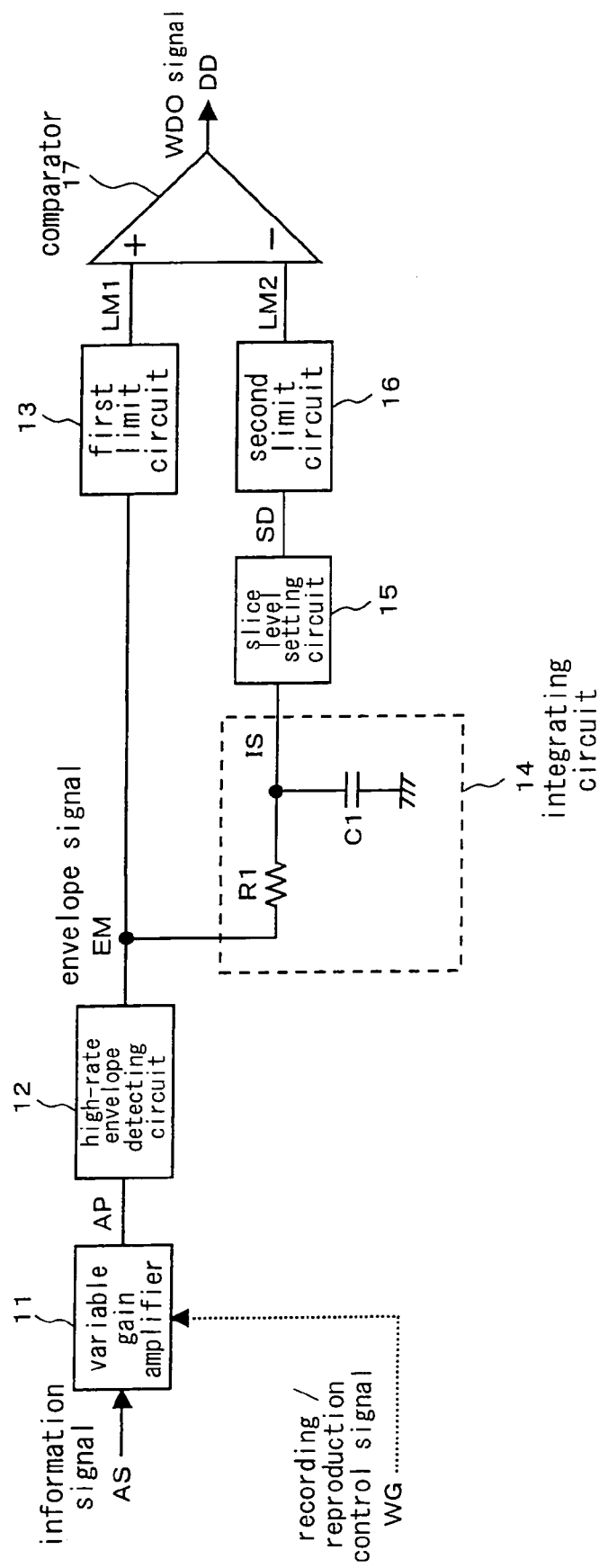
FIG. 11 is a block diagram illustrating a constitution of a white dot out detecting device according to a conventional technology.

Next, an operation of the white dot out detecting device according to the present embodiment constituted as above is described referring to a waveform chart shown in FIG. 10.

When the White Dot Out is Detected

In the period T2, the one-shot signal MM1 of the first monostable multivibrator circuit 20a is at the "L" level, and the initialization switch S2 is turned off. Further, the one-shot signal MM2 of the second monostable multivibrator 20 is also at the "L" level, and the short-circuit switch S1 is turned off. Therefore, the operation is the same as described in the embodiment 1.

When the Recording/Reproduction are Switched

When the operation with respect to the optical disk is shifted from the recording to the reproduction or from the reproduction to the recording, the edge detecting circuit 19 detects the change of the signal level of the recording/reproduction control signal WG, and the first monostable multivibrator circuit 20a changes the level of the one-shot signal MM1 to be "H". Then, the initialization switch S2 that detected the change to the "H" level is turned on, while the short-circuit switch S1 that cannot detect the change to the "H" level via the second monostable multivibrator circuit 20b remains turned off. Therefore, the voltage of the capacitance C1 is initialized to the limit voltage VL. As a result, the integration signal IS of the integrating circuit 14b is fixed to the limit voltage V1 during the period t1 (see P20).

When the pulse of the one-shot signal MM1 from the first monostable multivibrator circuit 20a is terminated (when the period t1 is terminated), the initialization switch S2 that detected the termination via the first monostable multivibrator circuit 20a is turned off. The second monostable multivibrator circuit 20b changes the level of the one-shot signal MM2 to be "H" during the period t2. Then, the short-circuit switch S1 that detected the change to the "H" level is turned on, and the time constant of the integrating circuit 14b is thereby reduced. As a result, the integration signal IS rapidly approximates to the envelope signal EM (see P21). In the foregoing manner, the generation of the false detection signal is prevented (see P22→P23), the detection of the white dot out can be sooner restarted immediately after the recording/reproduction are switched (see P24 and P25), and the stability in detecting the white dot out is increased.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A white dot out detecting device comprising: a recording/reproduction control signal generator for generating a recording/reproduction control signal showing a recording state or a reproducing state of an optical disk; a variable gain amplifier for amplifying and outputting an information signal read from the optical disk and adjusting a gain in the amplification based on the recording/reproduction control signal; an envelope detector for detecting an output envelope of the variable gain amplifier; an integrator for integrating an output of the envelope detector; a slice level setting unit for setting a slice level as a reference for detecting a white dot out based on an output of the integrator; a comparator for detecting the white dot out based on comparison of the output of the envelope detector and the slice level to each other; a level shifter for temporarily shifting the slice level to a high-level side when a change of the recording/reproduction control signal showing change of status from the recording state to the reproducing state or the reproducing states to the recording state is detected; a limiter for limiting the output of the envelope detector to stay within an input-side dynamic range of the comparator; and a limiter for limiting the output of the slice level setting unit to stay within the input-side dynamic range.

2. A white dot out detecting device as claimed in claim 1, further comprising a slice level shifter for shifting the slice level to even a higher-level side in synchronization with the level shifter when the change of the recording/reproduction control signal is detected.

3. A white dot out detecting device as claimed in claim 1, wherein the integrator comprises:
a first resistance serially connected to the output of the envelope detector;
a capacitance disposed between an output of the first resistance and a ground;
a second resistance connected in parallel to the first resistance; and
a short-circuit switch for controlling a state where the second resistance is connected to the first resistance, wherein
the level shifter temporarily turns on the short-circuit switch to thereby reduce a time constant of the integrator so that the slice level inputted to the comparator is shifted to the high-level side when the change of the recording/reproduction control signal is detected.

4. A white dot out detecting device as claimed in claim 1, wherein the integrator comprises:
a resistance serially connected to the output of the envelope detector;
a capacitance disposed between an output of the resistance and the ground; and
a short-circuit switch connected in parallel to the resistance, wherein
the level shifter temporarily turns on the short-circuit switch to thereby reduce a time constant of the integrator so that the slice level inputted to the comparator is shifted to the high-level side when the change of the recording/reproduction control signal is detected.

5. A white dot out detecting device as claimed in claim 1, wherein the integrator comprises:
a resistance serially connected to the output of the envelope detector;
a capacitance disposed between the resistance and a ground; and
an initialization switch for connecting the capacitance to a limit voltage, wherein
the level shifter temporarily turns on the initialization switch to thereby initialize a potential of the capacitance to the limit voltage so that the slice level inputted to the comparator is shifted to the high-level side when the change of the recording/reproduction control signal is detected.

6. A white dot out detecting device as claimed in claim 1, wherein the integrator comprises:
a resistance serially connected to the output of the envelope detector;
a capacitance disposed between an output of the resistance and a ground;
a short-circuit switch connected in parallel to the resistance; and
an initialization switch for connecting the capacitance to a limit voltage, wherein
the level shifter turns on the initialization switch to thereby initialize a potential of the capacitance of the integrator to the limit voltage and thereafter turns on the short-circuit switch to thereby reduce a time constant of the integrator so as to shift the slice level inputted to the comparator to the high-level side when the change of the recording/reproduction control signal is detected.

7. A white dot out detecting device as claimed in claim 1, wherein the recording/reproduction control signal generator is omitted, and a signal equal to the recording/reproduction control signal and externally supplied is used in place of the recording/reproduction control signal.

* * * * *

UNITED STATES PATENT AND TRADEMARK OFFICE
CERTIFICATE OF CORRECTION

PATENT NO. : 7,639,579 B2
APPLICATION NO. : 11/258042
DATED : December 29, 2009
INVENTOR(S) : Sakakibara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Ninth Day of November, 2010

David J. Kappos
*Director of the United States Patent and Trademark Office*